United States Patent Office 2,909,498
Patented Oct. 20, 1959

2,909,498

PROCESS FOR TREATING ASPHALTS IN PRESENCE OF QUINONE DIOXIME

Andrew F. Sayko, Westfield, N.J., assignor to Esso Research and Engineering Company, a corporation of Delaware No Drawing. Application March 29, 1957
Serial No. 649,280

4 Claims. (Cl. 260—28.5)

The present invention relates to an improved process for air blowing petroleum asphalts. More particularly, the present invention relates to an improved process for oxiding residual petroleum stocks by air-blowing them in the presence of a novel class of oxidation catalyst. Still more particularly, the present invention relates to the employment of certain derivatives of quinones, such as the oximes, and particularly and preferably the dioximes as asphalt oxidation catalysts.

The production of oxidized asphalts by blowing air through a petroleum residue or straight run asphalt at elevated temperatures is well known in the art of petroleum refining. It has been established that such a procedure has a decided effect upon the physical properties of the asphalt. In general, this technique serves to increase the hardness, softening point, pliability, and weathering resistance of an asphalt and decreases its ductility and susceptibility to changes in temperature. It will be noted that the hardness of a straight run asphalt may be greatly increased by extensive steam or vacuum distillation of the asphalt, but the resulting product in this instance is generally very temperature susceptible. The air blowing technique, in comparison with the vacuum distillation method, is capable of producing an asphaltic product of greater pliability but of the same hardness as an asphaltic product produced by vacuum distillation of the same straight run asphalt. As a result of their very desirable hardness, pliability and weathering resistance qualities, oxidized asphalts have become very popular in the production of roofing asphalts, protective coatings, electrical insulating compositions, moulded articles, and the like. In general, oxidized asphalts are available having softening points of about 100° to 250° F. or more and penetrations of about 200 down to about 10 (100 g./5 sec./77° F.). By comparison, straight reduced asphalts are generally available possessing softening points of about 100° F. to 170° F. and having penetration values of about 200 down to 10 or 20 (100 g./5 sec./77° F.).

In connection with the conventional process of air blowing petroleum asphalts, it has further been found that certain materials may be added to the asphalt being processed which will further modify the physical properties of the final product. For example, it has been established that compounds such as ferric chloride make possible the production of air-blown asphalts having even greater softening points for a given penetration than is possible by air blowing alone. The use of these materials also greatly reduces the period of time usually required in an air blowing operation. This catalyst, however, is not completely satisfactory. Its principal function is that of a reaction accelerator rather than a modifier of asphalt properties. Furthermore, the $FeCl_3$ tends to remain as a solid throughout the reaction, and may settle out of the finished product.

Other well known oxidation catalysts and product modifiers are $P_2O_5$ and other phosphates. These have not been found to be as effective at low concentrations as desired, nor to give a product as free of tack and low flow characteristics when subjected to a load.

It is the principal purpose of the present invention to set forth a catalyst which improves the rate of oxidation during air blowing of the asphalt. It is a further object of the present invention to set forth an oxidation catalyst that also improves the susceptibility characteristics of the air-blown asphalts, as well as the ductility thereof.

These and other objects of the present invention may be achieved by incorporating a derivative of a quinone, and in particular, the dioxime in an asphalt in an air blowing process. Generally speaking, a straight-run petroleum asphalt stock having the following physical characteristics is suitable for the production of an oxidized asphalt. It must be free from wax at a low softening point. The asphalt stock must be of a mixed base or naphthenic type. After oxidation it should have a high penetration for a given softening point. It must be ductile and pliable and resistant to weathering.

The asphalt is heated to a temperature of about 400° F. to not over 520° F. and is passed to a reaction zone or vessel where it is contacted with streams of air that are generally blown up through the asphalt at rates of about 30 to 60 cu. ft. per minute per ton of asphalt charge. This air blowing operation is continued until the asphalt charge has reached a desired degree of hardness, penetration, etc. Periods of about 48 to 72 hours are generally required for this purpose when processing 850 barrel batches in horizontal stills. In addition, this process may be carried out either batchwise or continuously, depending upon the equipment available.

Following the air blowing operation, the oxidized asphalt is removed from the air blowing zone or reactor and is pumped to any desired location. In some instances, it may be cut back with diluents such as petroleum naphtha, kerosene, fuel oil, etc. The preparation of cutback asphalts is well known in the art, and a detailed description of such an operation is therefore not required here.

The present invention modifies the above process in that 0.1 to 2.0% of the quinone derivative, and in particular, p-quinone dioxime, is employed as the catalyst.

The catalyst solution may be added to the hot asphalt either within the reactor or within the transfer line through which the asphalt flows to the reactor. It is preferred that the catalyst be added to the asphalt within the transfer line but either method may be used. Better contact and mixing is generally obtained by addition of the catalyst to the transfer line. Usually 1% or less by weight is all the catalyst that need be added. The catalyst is preferably added at its ambient temperature (80°–100° F.) by pumping it into the transfer line as charging of the reactor progresses and at a rate calculated to obtain uniform mixing. Agitation may additionally be obtained by air blowing. Blowing time may vary somewhat, depending upon the nature of the asphalt stock, the design of the apparatus, the relationship of penetration and softening point desired, etc.

In certain cases, particularly when the asphalt is to be employed in such services as road surfacing, it is desirable to include from 1 to 50% by weight of hydrocarbon polymers. A particularly desirable polymer is a copolymer of 50% isobutylene and 50% styrene, hereinafter referred to as Polymer "S." Other polymer additives may be butyl rubber, polyisobutylene, polyethylene, polystyrene, polypropylene, and natural rubber.

The following examples serve to illustrate the present process and its benefits:

Example 1

| Composition—Parts by Weight | 1 | 2 | 3 | 4 | 5 | 6 |
|---|---|---|---|---|---|---|
| 160–180 Ox. Asphalt | 100 | 100 | 100 | 98 | 98 | 98 |
| Polymer "S" | | | | 2 | 2 | 2 |
| p-quinone dioxime | 0.1 | 0.5 | 1.0 | 0.1 | 0.5 | 1.0 |
| After 1 hour @ 375° F.: | | | | | | |
| Softening Pt., ° F. (174) | 197 | 215 | 218 | 199 | 214 | 229 |
| Ductility at 77° F. (6.5) | 6.6 | 5.4 | 4.4 | 5.1 | 5.2 | 4.2 |
| Penetration at 77° F. (35) | 42 | 34 | 32 | 35 | 33 | 29 |
| Tensile at 77° F., p.s.i. (24.6) | 32 | 44 | 52 | 34 | 46 | 56 |
| After 6 hours @ 375° F.: | | | | | | |
| Softening Pt., ° F. | 198 | 215 | 232 | 206 | 220 | 238 |
| Ductility at 77° F. | 5.5 | 3.5 | 3.0 | 4.0 | 4.5 | 3.5 |
| Penetration at 77° F. | 37 | 42 | 29 | 37 | 32 | 29 |
| Tensile at 77° F., p.s.i. | 32 | 36 | 84 | 50 | 70 | 80 |

The control asphalt which has an initial softening point of 174° F. is not affected by additional heating. A slight increase in softening point of 3 to 4° F. has no effect on physical properties. Original properties of the control asphalt are shown in parentheses.

Example 2

The use of an activator such as $PbO_2$ increases the action of the catalyst. The following compositions were agitated at 375° F. for a total of 6 hours.

| | 1 | 2 | 3 |
|---|---|---|---|
| 160–180 Ox. Asphalt | 100.0 | 100.0 | 98.0 |
| p-quinone dioxime | 0.5 | | 0.5 |
| $PbO_2$ | 2.0 | 2.0 | 2.0 |
| Polymer "S" | | | 2.0 |
| Softening Pt., ° F. | 252 | 199 | 262 |
| Ductility at 77° F. | 2.6 | 5.0 | 2.3 |
| Penetration at 77° F. | 28 | 39 | 24K |
| Tensile at 77° F., p.s.i. | 66.4 | 12.8 | 70.0 |

The high softening point compositions resulting from the oxime-$PbO_2$ treatment had no tack and were rubbery and pliable even though their ductility was low. Thin sheets (¼″ thick) were prepared by milling on a warm mill. Pellets were then cut to give ¼″ cubes. The pellets showed no tendency to block, indicating a useful application for marketing asphalt blends as free-flowing pellets. Such compositions are useful for the preparation of road surfacing mixtures.

Example 3

A more efficient method of producing high softening point asphalts consists of the addition of all ingredients to the flux oil before oxidation. In this manner similar materials may be produced during the standard oxidation period thereby eliminating further blending and mixing.

The following oxidation runs were made at 475° F. with an air rate of 50 cu. ft. per minute per ton of asphalt. These conditions are comparable to current plant practice. Asphalt base is 500+° F. flash flux from Venezuelan crude.

1. Flux oil oxidized 3 hrs. at 475° F.
   Softening pt., ° F. _____ 168
   Ductility at 77° F., cm. _____ 8.3
   Penetration at 77° F. _____ 35
   Tensile at 77° F., p.s.i. _____ 20.0
2. Flux oil+0.1% oxime oxidized 3 hrs. at 475° F.
   Softening pt., ° F. _____ 238
   Ductility at 77° F., cm. _____ 3.5
   Penetration at 77° F. _____ 18.0
   Tensile at 77° F., p.s.i. _____ 94.0
3. Flux oil+2% Polymer "S"+0.1% p-quinone dioxime oxidized for 3 hrs. at 475° F.
   Softening pt., ° F. _____ 240
   Ductility at 77° F., cm. _____ 4.5
   Penetration at 77° F. _____ 24.0
   Tensile at 77° F., p.s.i. _____ 84.8

These runs demonstrate the accelerating effect of p-quinone dioxime in producing high softening point asphalts. An experiment conducted with 0.5% by weight of the oxime showed no greater effect than the 0.1% addition. The catalyst limits are from 0.1% to 2.0% with 0.1% to 0.5% being preferred.

Other polymers such at Butyl rubber, Vistanex, polyethylene, polystyrene, polypropylene, ethylene-propylene copolymers, ethylene-styrene copolymers may be added to the flux oil and oxidized with the oxime catalyst. Butyl rubber is a synthetic rubber prepared by low temperature copolymerization of isobutylene and isoprene, while Vistanex is a homopolymer of isobutylene and may have molecular weights from about 27,500 to 250,000 and even higher.

Example 2 demonstrates that the dioxime improves the rate of oxidation during the air blowing of an asphalt which is desirable in plant production. However, it is of major importance that the additive improve the susceptibility characteristics of the asphalt. This is shown in the following tabulation:

| | | | | |
|---|---|---|---|---|
| p-quinone dioxime (parts by weight) | 0 | 0.1 | 0 | 0.1 |
| Polymer "S" (parts by weight) | | | 2.0 | 2.0 |
| Softening Pt., ° F. | 238 | 238 | 240 | 240 |
| Penetration, at 77° F. | 13 | 18 | 13 | 24 |
| Ductility, at 77° F. | 3.0 | 3.5 | 3.0 | 4.5 |

This clearly shows that the use of 0.1% catalyst has a very desirable effect in improving the temperature susceptibility characteristics of the asphalt either when used alone or in conjunction with polymer. Likewise, there is shown an improvement in ductility. Both improvements are important in the preparation of asphalts for industrial use.

Example 4

The following data are presented to show the effect of p-quinone dioxime, as compared to $P_2O_5$ in the oxidation of a 500+° F. flash flux. Both experiments were conducted at 450°–475° F. with an air rate of 50 cu. ft. per minute per ton.

| | 0.10 part p-quinone dioxime | 1.6 parts $P_2O_5$ |
|---|---|---|
| Oxidation time | 3 hrs. | 3 hrs. 5 min. |
| Softening Pt., ° F. | 238 | 231. |
| Ductility at 77° F., cm | 3.5 | 4.0. |
| Penetration at 77° F. | 18 | 78. |
| Tensile Strength at 77° F., p.s.i. | 94 | 2. |

Advantages for p-quinone dioxime are: (1) effective at very low concentrations; (2) oxidized asphalt has good susceptibility, flexibility and strength. It is also free of tack and has low flow characteristics when subjected to a load. The $P_2O_5$ product, however, is soft, tacky and has poor strength. It is easily deformed by an applied load.

It will be appreciated that the present process may be modified in various respects without departing from the scope or spirit of the invention. For example, asphalts derived from cracking operations may be processed in a manner similar to straight-run asphalts. In addition, the present oxidation process may be combined with distillation steps to produce asphalts of a wide combination of properties, or residues that have been distilled further than desired may be blended with heavy petroleum distillates before oxidation.

It is understood that the present invention is not limited to p-quinone dioximes, but quinoidal oximes generally. Illustrative of other operable catalysts are benzoquinone dioxime, naphthoquinone dioxime, and like. Non-quinoidal dioximes however, have no apparent utility for this purpose.

What is claimed is:

1. A process for treating straight run petroleum asphalt stocks to produce asphalts of superior properties which comprises blowing said stocks with air at a temperature of from about 375° to about 520° F. in the presence of from about 0.1 to about 2.0% by weight of a quinone dioxime.

2. The process of claim 1 wherein said quinone is p-quinone.

3. The process of claim 1 wherein 1 to 50% by weight of a high molecular weight hydrocarbon polymer selected from the class consisting of copolymers of isobutylene and styrene, natural rubber, a synthetic rubber prepared by low temperature copolymerization of isobutylene and isoprene, a homopolymer of isobutylene having a molecular weight from about 27,500 to about 250,000, polyethylene, polystyrene, polypropylene, ethylene-propylene copolymers, ethylene-styrene copolymers, is incorporated in said asphalt.

4. The process of claim 3 wherein said polymer is a copolymer of about 50% isobutylene and about 50% styrene.

References Cited in the file of this patent
UNITED STATES PATENTS
1,762,688    Hofmann _____ June 10, 1930